3,551,523
POLYMERIZATION PROCESS FOR PREPARING
HIGH IMPACT POLYMERS
John J. Killoran, Worcester, Mass., assignor to Foster Grant Co., Inc., Leominster, Mass., a corporation of Delaware
No Drawing. Continuation of application Ser. No. 319,490, Oct. 28, 1963, which is a continuation-in-part of application Ser. No. 123,425, July 11, 1961. This application Sept. 22, 1966, Ser. No. 581,186
Int. Cl. C08f 7/04, 15/04
U.S. Cl. 260—880                                 9 Claims

ABSTRACT OF THE DISCLOSURE

A method of producing a high impact polymeric material by partially bulk polymerizing at least one monovinyl aromatic monomer in the presence of a rubbery polymer and then completing the polymerization in aqueous suspension. The suspension system for said process consists of (1) a polyvinyl alcohol suspending agent, (2) an anionic surfactant of the class consisting of sodium and potassium dodecylbenzene sulfonates and (3) an electrolyte.

---

This is a continuation of my copending application Ser. No. 319,490, filed Oct. 28, 1963, now abandoned, which in turn is a continuation-in-part of application Ser. No. 123,425, filed July 11, 1961, now abandoned.

This invention relates to an improved process of forming vinyl aromatic polymer compositions. More specifically, this invention relates to an improved process of polymerizing vinyl aromatic monomers in the presence of rubbery materials to produce polymeric compositions having improved properties.

Vinyl aromatic plastic molding compositions are widely employed in the plastics field but are restricted in their use in some applications by inadequate impact strength. It has long been recognized that incorporation of synthetic rubbery materials in vinyl aromatic polymer compositions increases their impact strength and in other respects improves their properties. High impact vinyl aromatic polymer materials of this type find use in such applications as refrigerator liners, radio and television casing, sheeting, etc.

Many methods have been proposed to incorporate rubbery materials in vinyl aromatic polymer materials. Such methods include the physical blending of vinyl aromatic polymers with rubber, preparing latices of vinyl aromatic polymers and rubber, then mixing the latices and coagulating, and polymerizing solutions of rubbery materials dissolved in vinyl monomers.

Polymerization of styrene in the presence of a rubber has generally introduced certain problems. As one example, unreacted ingredients such as monomer, if not removed, adversely affect the physical properties of the product. When bulk polymerization is employed, removal of exothermic heat not only limits batch size but renders product control difficult. The use of emulsion polymerization with subsequent coagulation requires large quantities of water to effect complete removal of emulsifying and coagulating agents. Aqueous suspension normally requires that a suspension of a relatively viscous, sticky rubber be maintained in the form of tiny droplets during the polymerization cycle. Suspensions of organic monomeric materials in water tend to be unstable and a danger of "clumping" or coagulation of the suspension, particularly during the early phases of a vinyl aromatic polymerization, is presented by the addition of rubbery materials. Certain combinations of the above have been suggested. As a result of the various difficulties outlined above, control of the physical properties of the materials produced has been difficult.

Broadly speaking, provided by this invention are processes comprising a critical combination of bulk and suspension polymerization techniques, which surprisingly yield polymeric materials having outstanding properties including high impact strengths and tensile properties. More specifically, it has been found that excellent impact resins can be prepared by prepolymerization of a mixture of vinyl aromatic materials and rubbery materials in bulk to a conversion of 15 to 40% by weight followed by aqueous polymerization utilizing a suspension agent comprising a combination of a polyvinyl alcohol suspending agent with a small effective amount of an anionic surface active agent. Surprisingly, this combination of suspending agent and surface active agent permits polymerization without substantial "clumping" or coagulation of the suspension system and allows formation of uniform polymeric beads without experiencing the losses associated with substantial formation of emulsion polymer.

The rubbery materials employed in this invention are synthetic rubbery polymeric derivatives of conjugated 4–6 carbon atom diolefins, as for example, homopolymers thereof and rubbery copolymers of butadiene-styrene, acrylonitrile-butadiene, 2,3-dimethyl butadiene, polychloroprene, and 1,4-polybutadiene having a cis content of at least 25% and a vinyl content less than about 10%, and the like. Mixtures of such suitable synthetic rubbery polymerics can be employed if desired, at times advantageously.

The vinyl aromatic monomers which may be employed in the practice of this invention comprise vinyl aryl compounds including styrene and its derivatives, such as halostyrenes, alkyl and aryl substituted styrenes and vinyl derivatives of naphthalene. Specific examples of such vinyl aromatic compounds include the methyl styrenes such as alpha-methyl styrene, vinyl toluene, bromostyrenes, phenyl styrenes, vinyl naphthalenes, chlorovinyl naphthalenes, etc. A preferred vinyl aromatic monomer is styrene.

These vinyl aryl compounds may be employed with the rubbery materials, according to the processes of this invention, alone, in mixtures containing one or more vinyl aryl compounds, or with one or more other copolymerizable ethylenic compounds.

Ethylenic compounds which can be incorporated into the monomer mixture are any suitable ethylenic monomers copolymerizable with the monovinyl aromatic monomer employed. Such ethylenic compounds which may be employed in replacement of a portion of a monovinyl aroamtic monomer in the monomer mixture, include the following in illustration: vinyl halides, e.g., vinyl chloride, vinyl fluoride, and the like; acrylic acids, e.g., acrylic acid, methacrylic acid, chloroacrylic acid, beta-cyanoacrylic acid and the like; esters of acrylic acids, e.g., methyl acrylate, ethyl acrylate, ethyl methacrylate, methyl methacrylate, methyl chloroacrylate, fluorophenyl acrylate, methyl beta - cyanoacrylate, and the like; nitrile derivatives of ethylenically unsaturated acids such as acrylic, methacrylic, and chloroacrylic, e.g., acrylonitrile methacrylonitrile, chloroacrylonitrile, fumaronitrile, and the like; certain allyl derivatives such as allyl acetate; esters of dicarboxylic acids such as maleic; fumaric and itaconic acids, e.g., mono- and dimethyl maleates, methyl fumarates, isopropyl maleates, ethyl itaconates, and the like; vinyl ethers, e.g., vinyl methyl ether, vinyl phenyl ether, and the like. Vinyl aromatic monomers or mixtures thereof may be employed with any copolymerizable ethylenic monomers such as the above or mixtures thereof.

The vinyl aromatic monomers are employed in amounts of about 70 to 99% by weight and the rubbery materials are employed in amounts of about 30 to 1% based on the total monomer-rubbery material weight. If there is employed one or more of the above noted ethylenically unsubstituted monomers copolymerizable with the vinyl aromatic monomers, the monomer mixture is as follows: the vinyl aromatic portion comprises 20 to 98% by weight of at least one vinyl aromatic compound and the ethylenically substituted monomer portion comprises 80 to 2% by weight of at least one ethylenically unsubstituted monomer, on the basis of total monomer weight.

The bulk prepolymerization technique employed in my invention comprises either catalytic or thermal polymerization of the vinyl aromatic monomer-rubbery materials polymerization mixture to a conversion suitably of about 15 to about 40% (desirably at least to a 20% conversion) and preferably to about 20 to about 30% conversion. The term "conversion" as used herein refers to the percentage by weight of monomer polymerized.

When thermal polymerization is employed, polymerizations are suitably conducted at temperatures of 80° C. to 120° C. for 4 to 20 hours preferably at 90° C. to 105° C. for 6 to 18 hours. When free radical catalysts or initiators are employed, commonly employed is a catalyst in amount of 0.03 to 0.6%, depending upon the catalysts and conditions used. Polymerizations are suitably conducted for 4 to 24 hours at temperatures of 70° C. to 110° C., preferably at 75° C. for 5 to 20 hours, depending upon the various influencing factors.

After the reaction mixture of vinyl aromatic materials and rubbery materials has reached the desired conversion, the reaction mixture is suspended in an aqueous medium and polymerization is continued to completion with a conversion of at least 70% by weight being finally attained. The second or suspension polymerization stage can be carried out in illustration at temperatures of 90 to 104° C., preferably at 115 to 130° C. for a period of 2 to 10, and preferably 4 to 6 hours, depending on catalysts, concentrations, monomers, etc. employed.

As mentioned hereinabove, both thermal and free radical initiation can be employed in the processes of this invention. Peroxide initiators have been found to be suitable. Several classes of peroxide initiators can be employed as exemplified by the following: benzoyl peroxide, chlorobenzoyl peroxide, bromobenzoyl peroxide, fluorobenzoyl peroxide, naphthal peroxide, lauroyl peroxide, myristyl peroxide, stearyl peroxide, di-tertiary-butyl peroxide, hydrogen peroxide, decanoyl peroxide, p-methane hydroperoxide, etc., or combinations thereof. Also, suitable azo catalysts can be used either alone or in combination. A suitable azo catalyst is azo-bis-isobutyronitrile.

It is preferred to employ molecular weight modifiers in the processes of this invention. These molecular weight modifiers may be selected from well known modifiers. Illustrative of such modifiers include dimers of alpha-methylstyrene, alkyl or aryl mercaptans having 3 to 16 carbon atoms in the molecule such as dodecyl mercaptan and tertiary dodecyl mercaptan, 1-phenyl butene-2, fluorene, dipentene, and the like. These molecular weight modifiers may be employed in effective amounts of at least about 0.03%, preferably up to about 0.5%, based on the total monomer-rubbery material weight.

As aforementioned, supra, the specific suspending systems employed in this invention are mixtures of polyvinyl alcohols and anionic surface active agents in aqueous media.

The surface active agents which may be employed in this invention are of an anionic character, i.e., surface active agents in which the organophylic group is contained in the anion. Specific anionic surfactants found suitable are the sodium and potassium dodecylbenzene sulfonates. Any suitable effective small amount of the anionic surfactant can be employed, preferably about 0.002 to about 0.06% based on weight of water.

The polyvinyl alcohol suspending agent enables production of desirably small, discrete beads of uniform size. It is essential that the amount of polyvinyl alcohol utilized be as small as possible since it is known that significant quantities of residual polyvinyl alcohol that cannot be practically washed out of the end polymer beads can cause discoloration in the final polymeric material. High amounts of polyvinyl alcohol additionally can cause difficulties in obtaining the required low moisture content and hardness in the final bead product, whereas the polymeric beads produced by this invention can be readily dried in a relatively short drying period at temperatures safely below the fusion point of the polymer. Also, presence of large amounts of polyvinyl alcohol in excess of 0.2% can cause troublesome excessive foaming during polymerization. Further, the use of small amounts of polyvinyl alcohol permits accurate control of bead size and avoids the formation of undesired emulsion polymer. Another advantage of this suspension system is the considerable latitude in pH range permissible without causing unwanted coagulation during the aqueous polymerization. According to the practice of this invention, it is possible to use an extremely small amount of polyvinyl alcohol while obtaining a useful suspension by employing in conjunction with the polyvinyl alcohol a small effective percentage of an anionic surface active agent.

Regarding the beads of the final product, it is presently desired to have beads having a small uniform diameter size but not excessively fine. Suitably, for most present commercial needs, the beads fall largely in a mesh size range of from about 10 to 60 in the U.S. Sieve Series, preferably in the range from about 20 to 50 mesh.

The polyvinyl alcohol utilized in a small effective amount is preferably a hydrolyzed polyvinyl acetate having a viscosity of 20 to 65 centipoises as measured as a 4% water solution at 20° C. as determined by Hoeppler falling ball method and having a degree of hydrolysis at least 80% by weight of the polyvinyl acetate. The amount employed can vary widely up to about 0.2% by weight of the suspending media (water) depending upon various polymerization factors. It is desired to use as small an amount as practicable and yet obtain together with the anionic surfactant employed, an effective suspending action. Ordinarily, a suitable amount is about 0.01 to about 0.2%, based on the weight of water.

In addition, it has been found that various electrolytes such as calcium, potassium, and sodium chlorides, etc. in amounts of 0.1 to 4% by weight of the suspending media are advantageously employed in the preferred system to reduce the formation of emulsion polymer and to control bead size distribution. It is desirable to employ a neutral electrolyte salt, preferably a salt of a strong acid and strong base.

In the systems of this invention, the water to monomer ratio may vary as from 0.75 to 2. However, it is preferred to employ a ratio of about 1.

In these examples and in the foregoing specification, parts and percentages are expressed by weight based on the total monomer-rubbery material weight unless otherwise specified. Viscosities of products given are viscosities of 8% by weight solutions in toluene at 25° C.

EXAMPLE 1

Into a suitable reaction vessel is charged 5.4 parts of a rubbery polymer of 1,4-polybutadiene having a cis content of 95% and a vinyl content of 2%. The rubbery polymer is dissolved in 100 parts of styrene monomer together with 0.05 part of tertiary-butyl peracetate, 0.3 part of an anti-oxidant, 0.03 part of dodecyl mercaptan and 2 parts of a refined hydrocarbon oil plasticizer. The reaction vessel is swept free of oxygen with nitrogen. The reaction vessel is agitated and heated in mass at 100° C. to a 30% conversion.

The reaction vessel is then charged with 100 parts of water having dissolved therein 0.1 part of polyvinyl alcohol, 0.2 part of dodecylbenzene sodium sulfonate and 0.5 part of KCl, based on the weight of water. The reaction vessel is then swept with nitrogen, agitated and heated for 8 hours at 130° C.

A polymer is obtained in the form of homogeneous small spherical beads having a narrow distribution of particle sizes. The yield is substantially quantitative as only about 0.5% of the polymer is emulsified.

The Izod impact value of the polymer produced is 2.2.

EXAMPLE 2

The procedure of Example 1 is essentially repeated employing a rubbery interpolymer of 77% butadiene and 23% styrene as the rubbery material.

A product in bead form is obtained in which the beads are of uniform size of which over 80% fall within a 10–60 mesh range. No significant amount of the beads are retained by a No. 5 mesh screen.

EXAMPLE 3

The procedure of Example 1 is essentially repeated employing a monomer mixture of about 70 parts of styrene and about 25 parts of methyl methacrylate, together with 5 parts of a rubbery interpolymer of 77% butadiene and 23% styrene. Polyvinyl alcohol is employed in an amount of 0.05 part. A small sized bead product of desired uniformity is obtained.

EXAMPLE 4

Example 1 is essentially repeated employing thermal catalysis. A 25% conversion is obtained in the bulk polymerization step and a small sized bead product of desired uniformity is obtained.

EXAMPLE 5

Example 1 is essentially repeated employing 5 parts of a rubber of 77% butadiene and 23% styrene, 0.02% polyvinyl alcohol, and 0.02% part of sodium dodecylbenzene sulfonate as surfactant. A conversion of 25% is obtained in the bulk polymerization step. The product has an Izod impact of about 2. Upwards of 90% of the final beads have a mesh size between about 10 and 60 mesh with essentially none being retained on a No. 5 mesh sieve.

EXAMPLE 6

Example 1 again is essentially repeated employing 6 parts of a rubbery interpolymer of approximately 77% butadiene and 23% styrene and a monomer mixture of 66 parts of styrene monomer and 28 parts of acrylonitrile together with 0.05 part of di-t-butyl peroxide, 0.3 part of anti-oxidant, 0.1 part of dodecyl mercaptan and 2 parts of refined hydrocarbon oil plasticizer. The bulk polymerization is carried out to a conversion of approximately 15%. The aqueous polymerization mixture has 0.1 part of polyvinyl alcohol, 0.02 part of dodecylbenzene sodium sulfonate and 0.5 part KCl and the aqueous polymerization is conducted for 6 hours at 90° C. for about 5 hours at 110° C.

A polymer is obtained in the form of desired homogeneous small spherical beads having a narrow distribution of particle size. Not more than about 0.5% of unwanted emulsified polymer is produced.

The Izod impact value of the produced polymer is 1.0 (determined employing notched test specimens having cross section of ½" x ⅛" following ASTM Test D256–56, as are other Izod impact values stated herein).

Many changes and alterations will be suggested to those skilled in the art in view of the disclosures and teachings made herein without departing from the spirit and scope of this invention and it is to be understood that such are intended to be a part thereof.

What is claimed is:
1. A method of producing a high impact polymer material, said method comprising:
   (1) bulk polymerizing at least one monovinyl aromatic monomer in the presence of from about 1 to about 30% by weight, based on the total monomer-rubbery polymer weight, of a synthetic rubbery polymer of a 4 to 6 carbon atom diolefin to a conversion to polymer of about 20 to 40% of said monomer; and
   (2) continuing the polymerization of the partially converted polymerization mixture to a conversion of at least 70% by weight under aqueous suspension polymerization conditions utilizing a water to monomer ratio of 0.75–2.0 to 1, and wherein the aqueous medium employs a suspension system dissolved therein for suspending said partially converted mixture, said suspension system consisting of an amount in the range of from about 0.01 to about 0.06% of an anionic surfactant of the class consisting of sodium and potassium dodecylbenzene sulfonates, and polyvinyl alcohol suspending agent in an amount in the range of from about 0.01 to about 0.2%, and an effective amount of an electrolyte in the range of from about 0.1% to about 4% based on the weight of the water of the aqueous medium.

2. A method of claim 1 wherein styrene is employed as said monomer.

3. A method of claim 2 wherein said rubbery material employed is a 1,3-butadiene polymer.

4. The method of claim 2 wherein said rubbery material is from about 1 to about 30% by weight of a 1,4-butadiene having a cis content of at least 25% and a vinyl content of less than 10% by weight.

5. The method of claim 2 wherein said rubbery material is employed in an amount from about 1 to about 30% by weight of a butadiene-styrene rubber.

6. The method of claim 1 wherein said monomer has an amount up to 80% of an ethylenic monomer copolymerizable with a monovinyl aromatic monomer, said percentage based on the total monomer weight.

7. The method of claim 6 wherein said copolymerizable ethylenic monomer is acrylonitrile, and the monovinyl aromatic monomer is styrene.

8. The method of claim 6 wherein said copolymerizable ethylenic monomer is methyl methacrylate, and the monovinyl aromatic monomer is styrene.

9. The method of claim 2 wherein the surfactant is sodium dodecyl benzene sulfonate.

References Cited

UNITED STATES PATENTS

| | | | |
|---|---|---|---|
| 2,715,118 | 8/1955 | Grim | 260—93.5W |
| 2,862,906 | 12/1958 | Stein et al. | 260—880X |
| 3,047,534 | 7/1962 | Dyer et al. | 260—880 |
| 3,188,364 | 6/1965 | Brown et al. | 260—880 |

FOREIGN PATENTS

| | | | |
|---|---|---|---|
| 591,753 | 2/1960 | Canada | 260—880 |
| 857,125 | 12/1960 | Great Britain | 260—93.5S |
| 1,213,183 | 10/1959 | France | 260—880 |

JAMES A. SEIDLECK, Primary Examiner

U.S. Cl. X.R.

260—93.5